United States Patent
Luan et al.

(10) Patent No.: US 7,809,561 B2
(45) Date of Patent: Oct. 5, 2010

(54) METHOD AND APPARATUS FOR VERIFICATION OF SPEAKER AUTHENTICATION

(75) Inventors: Jian Luan, Don Cheng District (CN); Jie Hao, Don Cheng District (CN)

(73) Assignee: Kabushiki Kaisha Toshiba, Tokyo (JP)

( * ) Notice: Subject to any disclaimer, the term of this patent is extended or adjusted under 35 U.S.C. 154(b) by 826 days.

(21) Appl. No.: 11/692,470

(22) Filed: Mar. 28, 2007

(65) Prior Publication Data

US 2007/0239449 A1    Oct. 11, 2007

(30) Foreign Application Priority Data

Apr. 6, 2006    (CN) .................... 2006 1 0073142

(51) Int. Cl.
*G10L 15/12*    (2006.01)
(52) U.S. Cl. ...................... 704/241; 704/203
(58) Field of Classification Search ................ 704/241, 704/243, 203

See application file for complete search history.

(56) References Cited

U.S. PATENT DOCUMENTS

| | | | |
|---|---|---|---|
| 5,054,083 A | * | 10/1991 | Naik et al. .................. 704/272 |
| 5,167,004 A | * | 11/1992 | Netsch et al. ............... 704/200 |
| 5,839,103 A | * | 11/1998 | Mammone et al. .......... 704/232 |
| 6,519,561 B1 | * | 2/2003 | Farrell et al. ................ 704/232 |
| 6,760,701 B2 | * | 7/2004 | Sharma et al. .............. 704/249 |
| 7,386,448 B1 | * | 6/2008 | Poss et al. ................... 704/247 |
| 7,389,228 B2 | * | 6/2008 | Rajput et al. ................ 704/236 |
| 7,529,669 B2 | * | 5/2009 | Ravi et al. ................... 704/249 |

* cited by examiner

*Primary Examiner*—Abul Azad
(74) *Attorney, Agent, or Firm*—Oblon, Spivak, McClelland, Maier & Neustadt, L.L.P.

(57) ABSTRACT

The present invention provides a method and apparatus for verification of speaker authentication. A method for verification of speaker authentication, comprising: inputting an utterance containing a password that is spoken by a speaker; extracting an acoustic feature vector sequence from said inputted utterance; DTW-matching said extracted acoustic feature vector sequence and a speaker template enrolled by an enrolled speaker; calculating each of a plurality of local distances between said DTW-matched acoustic feature vector sequence and said speaker template; nonlinear-transforming said each local distance calculated to give more weights on small local distances; calculating a DTW-matching score based on said plurality of local distances nonlinear-transformed; and comparing said matching score with a predefined discriminating threshold to determine whether said inputted utterance is an utterance containing a password spoken by the enrolled speaker.

8 Claims, 3 Drawing Sheets

METHOD AND APPARATUS FOR VERIFICATION OF SPEAKER AUTHENTICATION

TECHNICAL FIELD

The present invention relates to information processing technology, specifically to the technology of speaker authentication.

TECHNICAL BACKGROUND

By using pronunciation features of each speaker when he/she is speaking, different speakers may be identified, so as to make speaker authentication. In the article "Speaker recognition using hidden Markov models, dynamic time warping and vector quantisation" written by K. Yu, J. Mason, J. Oglesby (Vision, Image and Signal Processing, IEE Proceedings, Vol. 142, October 1995, pp. 313-18), commonly used three kinds of speaker identification engine technologies have been introduced: HMM (Hidden Markov Model), DTW (Dynamic Timing Warping) and VQ (Vector Quantization).

Generally, a speaker authentication system includes two phases: enrollment and verification. In the phase of enrollment, a speaker template of a speaker (client) is produced according to an utterance containing a password that is spoken by the speaker; in the phase of verification, it is determined according to the speaker template whether the testing utterance is an utterance containing the same password spoken by the speaker. Specifically, a DTW algorithm is usually used in the phase of verification to DTW-match an acoustic feature vector sequence of the testing utterance and a speaker template to obtain a matching score, and the matching score is compared with a discriminating threshold obtained in the phase of enrollment to determine whether the testing utterance is an utterance containing the same password spoken by the speaker. In the DTW algorithm, a common way to calculate a global matching score between an acoustic feature vector sequence of a testing utterance and a speaker template is to add up all local distances along an optimal matching path directly. However, there are often some big local distances due to matching mistakes during a client trial. This may bring difficulties to distinguishing clients from impostors.

A speaker verification system based on frame-level verification is proposed in an article "Enhancing the stability of speaker verification with compressed templates" written by X. Wen and R. Liu, ISCSLP2002, pp. 111-114 (2002). A fuzzy logic-based speech recognition system is described in an article "Fuzzy logic enhanced symmetric dynamic programming for speech recognition" written by P. Mills and J. Bowles, Fuzzy systems, proceedings of the Fifth IEEE International Conference on, Vol. 3, pp. 2013-2019 (1996). The concept of these two methods is to apply a transform to the local distances in a DTW algorithm. However, these two methods are sensitive to parameters and proved to be effective only when suitable parameters are set for each template.

SUMMARY OF THE INVENTION

In order to solve the above-mentioned problems in the prior technology, the present invention provides a method and apparatus for verification of speaker authentication.

According to an aspect of the present invention, there is provided a method for verification of speaker authentication, comprising: inputting an utterance containing a password that is spoken by a speaker; extracting an acoustic feature vector sequence from said inputted utterance; DTW-matching said extracted acoustic feature vector sequence and a speaker template enrolled by an enrolled speaker; calculating each of a plurality of local distances between said DTW-matched acoustic feature vector sequence and said speaker template; nonlinear-transforming said each local distance calculated to give more weights on small local distances; calculating a DTW-matching score based on said plurality of local distances nonlinear-transformed; and comparing said matching score with a predefined discriminating threshold to determine whether said inputted utterance is an utterance containing a password spoken by the enrolled speaker.

According to another aspect of the present invention, there is provided an apparatus for verification of speaker authentication, comprising: an utterance input unit configured to input an utterance containing a password that is spoken by a speaker; an acoustic feature vector sequence extractor configured to extract an acoustic feature vector sequence from said inputted utterance; a DTW-matching unit configured to DTW-match said extracted acoustic feature vector sequence and a speaker template enrolled by an enrolled speaker; a local distance calculator configured to calculate each of a plurality of local distances between said DTW-matched acoustic feature vector sequence and said speaker template; a local distance nonlinear-transform unit configured to nonlinear-transform said each local distance calculated to give more weights on small local distances; a matching score calculator configured to calculate a DTW-matching score based on said plurality of local distances nonlinear-transformed; and a compare unit configured to compare said matching score with a predefined discriminating threshold to determine whether said inputted utterance is an utterance containing a password spoken by the enrolled speaker.

BRIEF DESCRIPTION OF THE DRAWINGS

It is believed that through following detailed description of the embodiments of the present invention, taken in conjunction with the drawings, above-mentioned features, advantages, and objectives will be better understood.

DETAILED DESCRIPTION OF THE INVENTION

Next, a detailed description of the preferred embodiments of the present invention will be given in conjunction with the drawings.

Figure 1:
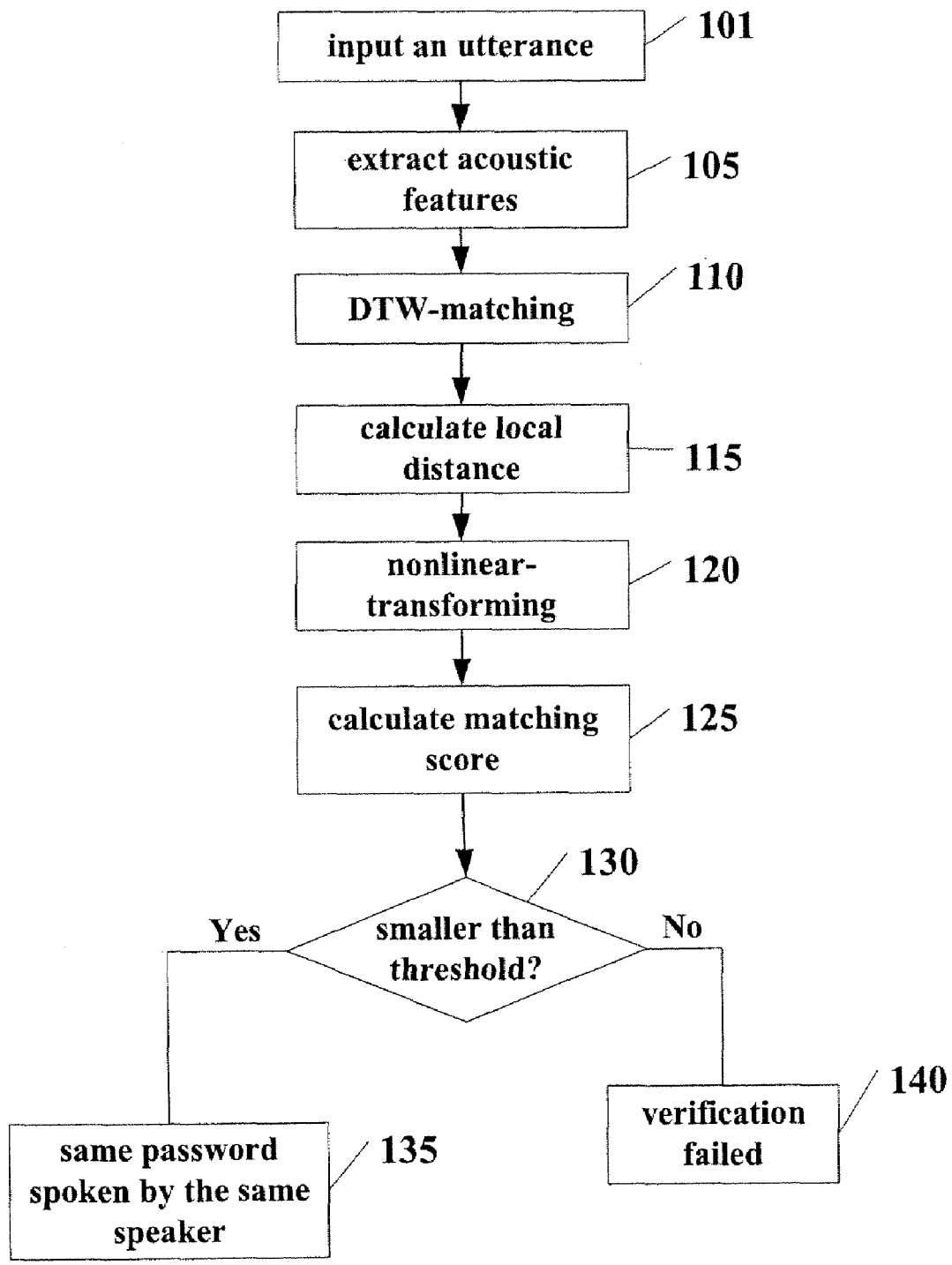
FIG. 1 is a flowchart showing a method for verification of speaker authentication according to an embodiment of the present invention.

FIG. 1 is a flowchart showing a method for verification of speaker authentication according to an embodiment of the present invention. Next, the embodiment will be described in conjunction with the drawing.

As shown in FIG. 1, first in step 101, an utterance containing a password is inputted by a client needed to be verified, wherein the password is a special term or phoneme sequence that is set by a client for verification in a phase of enrollment.

Next, in step 105, an acoustic feature vector sequence is extracted from the inputted utterance. The invention has no specific limitation to the way to express an acoustic feature, and it may be, for example, MFCC (Mel-scale Frequency Cepstral Coefficients), LPCC (Linear Predictive Cepstrum Coefficient) or other coefficients obtained based on energy, fundamental tone frequency, or wavelet analysis, as long as it can express personal utterance characteristics of a speaker; however, it should be corresponded with the way used to express an acoustic feature in the phase of enrollment.

Figure 2:
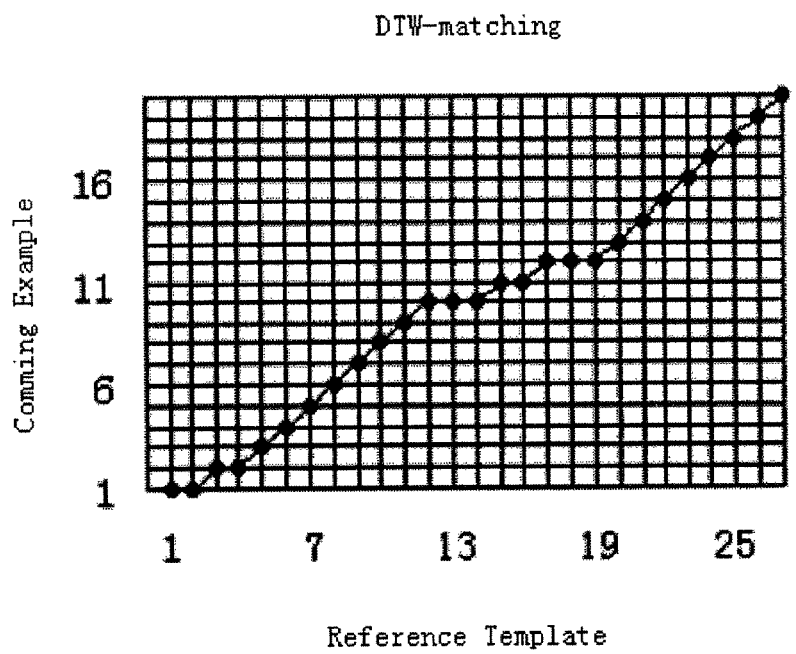
FIG. 2 shows an example of a DTW-matching between an input sample and a reference template.

Next, in step 110, an optimal matching path is obtained by DTW-matching the extracted acoustic feature vector sequence and the speaker template enrolled by the enrolled speaker. Specifically, FIG. 2 shows an example of DTW-matching between an input sample and a reference template. As shown in FIG. 2, the horizontal axis represents frames of the speaker template, and the vertical axis represents frames of the inputted utterance. When the DTW-matching is performed, local distances between each frame of the speaker template and a corresponding frame of the inputted utterance and adjacent frames thereof are calculated, and the frame of the inputted utterance, which has the smallest local distance, is selected as the frame corresponding to the frame of the speaker template. The step is repeated until each of all frames of the inputted utterance is found a corresponding frame of the speaker template, thereby an optimal matching path can be obtained.

The speaker template in this embodiment is a speaker template generated by a method for enrollment of speaker authentication, which includes at least acoustic features corresponding to the password utterance and a discriminating threshold. The process for enrollment of speaker authentication will be described simply herein. First, an utterance containing the password spoken by the speaker is inputted. Next, an acoustic feature is extracted from the inputted password utterance. Then, the speaker template is produced. The speaker template can be built with a number of utterances for training in order to improve the quality of the speaker template. First, a training utterance is selected to be an initial template. Then, a second training utterance is aligned with the initial template by DTW method, and a new template is produced with the average of the corresponding feature vectors in the two utterances. Then, a third training utterance is aligned with the new template by the DTW method. The above process is repeated until all training utterances are merged to single template, that is, so-called template merging is made. About template merging, reference may be made to the article "Cross-words reference template for DTW-based speech recognition systems" written by W. H. Abdulla, D. Chow, and G. Sin (IEEE TENCON 2003, pp. 1576-1579).

Moreover, in the phase of enrollment of speaker authentication, the discriminating threshold contained in the speaker template can be determined in the following manner. First, two distributions of DTW-matching scores of the speaker and other people are obtained by collecting two big sets of utterance data containing a same password spoken by the speaker and spoken by other people respectively, and DTW-matching the two sets of utterance data with the trained speaker template, respectively. Then, the discriminating threshold for the speaker template can be estimated in at least the following three ways:

a) setting the discriminating threshold to the cross point of the two distribution curves, that is, the place where the sum of FAR (False Accept Rate) and FRR (False Reject Rate) is minimum;

b) setting the discriminating threshold to the value corresponding to EER (Equal Error Rate); or c) setting the discriminating threshold to the value that makes false accept rate a desired value (such as 0.1%).

Back to FIG. 1, next, in step 115, each of the local distances between the DTW-matched acoustic feature vector sequence and the speaker template is calculated. That is, the local distances between corresponding frames of an inputted utterance and a speaker template in the optimal matching path of FIG. 2 are calculated.

Figure 3:
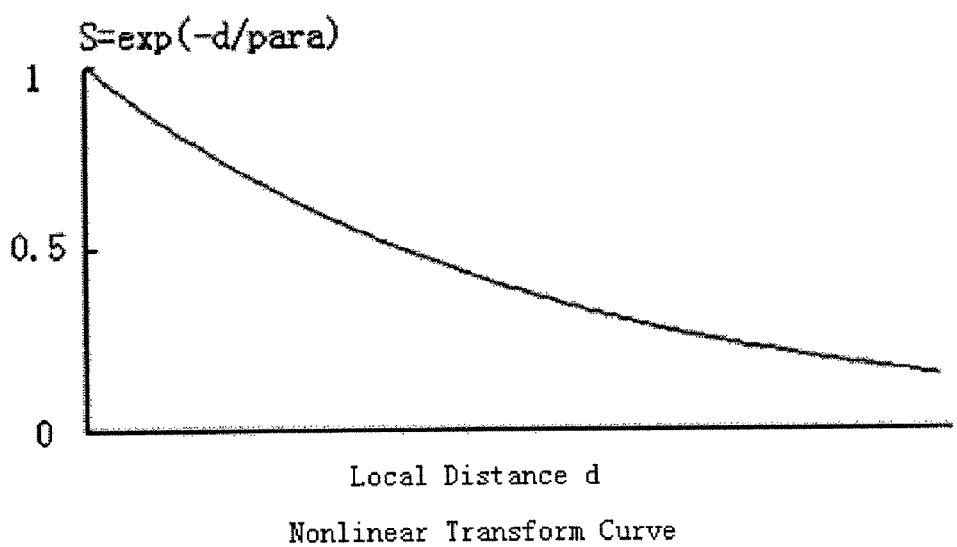
FIG. 3 shows an example of a nonlinear transform curve.

Next, in step 120, each local distance calculated is nonlinear-transformed to give more weights on small local distances. In the embodiment, the nonlinear transform is performed by using a function $S=\exp(-d/para)$ as shown in FIG. 3. In FIG. 3, the horizontal axis represents the local distance d, and the vertical axis represents the value of the function S. In the nonlinear transform formula of the embodiment, d is the local distance, and para is the parameter of the nonlinear transform, which can be used to adjust the shape of the curve of the function.

In an application, the para may be independent form the template, i.e., it is a constant. Moreover, it may be template-dependent (or template-specific), i.e., each template has a fixed parameter, for example, the discriminating threshold of the template may be used as the para; or it may be template-dependent and frame-dependent, i.e., each frame of each template has a separate parameter.

The template-dependent parameter may be obtained by the above-mentioned method of calculating the discriminating threshold of the speaker template.

The frame-dependent parameter may be obtained by the same method of calculating the discriminating threshold of the speaker template except to make statistics for each frame separately. Specifically, two distributions of DTW-matching scores of each frame of the speaker and other people are obtained by collecting two sets of utterance data containing the same password spoken by the speaker and spoken by other people, and DTW-matching the two sets of utterance data with the trained speaker template, respectively. Then, the frame-dependent parameter can be estimated by at least the following three ways:

a) setting the frame-dependent parameter to the cross point of the two distribution curves of each frame of the speaker and other people, that is, the place where the sum of FAR (False Accept Rate) and FRR (False Reject Rate) is minimum;

b) setting the frame-dependent parameter to the value corresponding to EER (Equal Error Rate); or c) setting the frame-dependent parameter to the value that makes false accept rate a desired value (such as 0.1%).

Of course, the parameter can be properly adjusted according to various nonlinear transform functions to achieve an optimum performance, for example, adding 4 to the parameter, that is, $S=\exp(-d/(para+4))$.

Furthermore, the nonlinear transform function of the invention is not limited to $S=\exp(-d/para)$. All transform functions, the third derivative of which is negative at the range of $(0, \infty)$, may achieve the goal mentioned above "give more weights on small local distances in all the situations", e.g. $S=\ln(d/para)$, $S=\arctan(d/para)$, $S=para/d$ and a nested combination thereof, for example, $S=\arctan(\exp(-d/para))$, or an extension thereof, for example, $S=\mathrm{pow}(\exp(-d/para), 2)$ etc.

Then, in step 125, a DTW-matching score is calculated according to each of the above local distances nonlinear-transformed. Specifically, the matching score can be obtained by adding up all the local distances that have been nonlinear-transformed.

Next, in step 130, it is determined whether the above-mentioned DTW-matching score is smaller than the discriminating threshold set in the speaker template. If it is yes, the verification is successful that the same password spoken by the same speaker is confirmed in step 135. If it is no, the verification is unsuccessful in step 140.

Through the above description, it is known that if the method for verification of speaker authentication according to the embodiment is employed, more weights can be given on small local distances by the nonlinear transform when the global matching distance is calculated, thereby it is insensitive to the parameter. The transform may also be effective even when a constant parameter is set for all templates. Moreover, if the template-dependent parameter is used, the transform has better performance than the two previous methods mentioned above. Moreover, the frame-dependent parameter can also be used, by which the system performance may be further enhanced.

Figure 4:
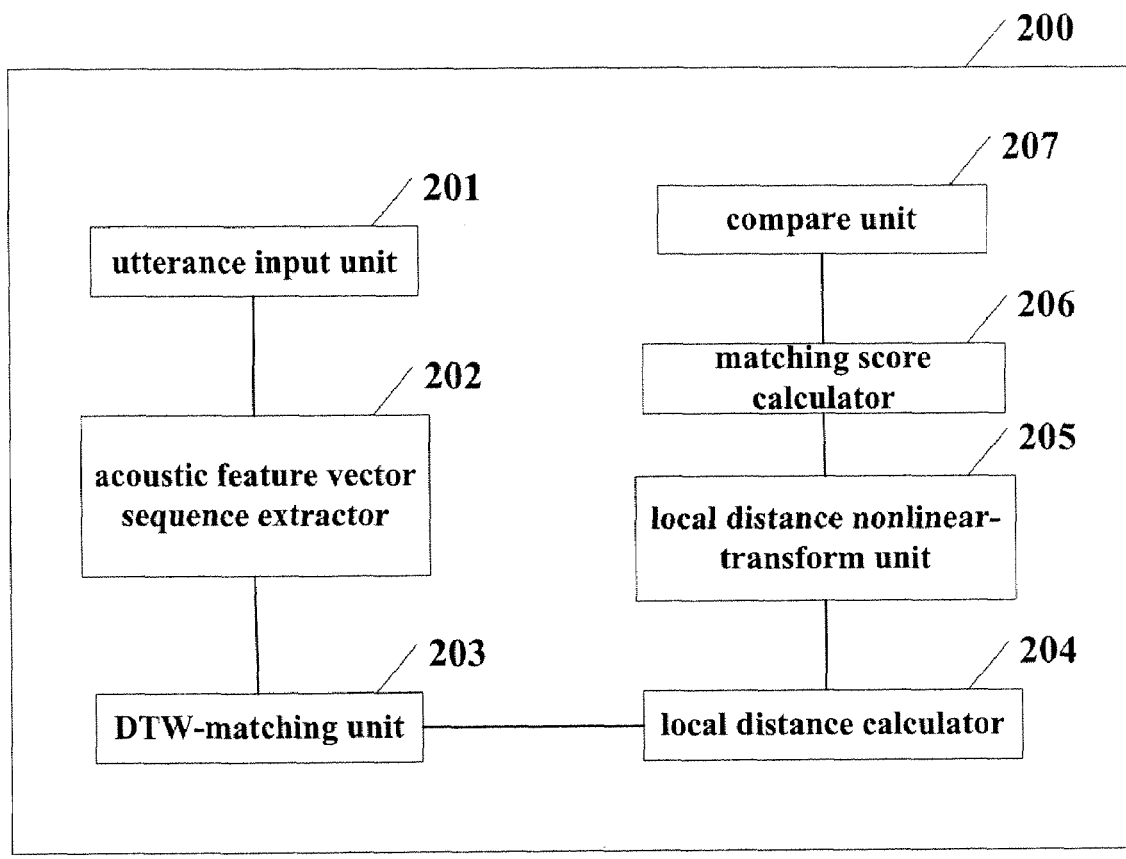
FIG. 4 is a block diagram showing an apparatus for verification of speaker authentication according to an embodiment of the present invention.

Based on the same concept of the invention, FIG. 4 is a block diagram showing an apparatus for verification of speaker authentication according to an embodiment of the present invention. The description of this embodiment will be given below in conjunction with FIG. 4, with a proper omission of the same content as those in the above-mentioned embodiments.

As shown in FIG. 4, an apparatus 200 for verification of speaker authentication in this embodiment comprises: an utterance input unit 201 configured to input an utterance containing a password that is spoken by a speaker; an acoustic feature vector sequence extractor 202 configured to extract an acoustic feature vector sequence from the inputted utterance; a DTW-matching unit 203 configured to DTW-match the extracted acoustic feature vector sequence and a speaker template enrolled by an enrolled speaker; a local distance calculator 204 configured to calculate each of a plurality of local distances between the DTW-matched acoustic feature vector sequence and the speaker template; a local distance nonlinear-transform unit 205 configured to nonlinear-transform each local distance calculated to give more weights on small local distances; a matching score calculator 206 configured to calculate a DTW-matching score based on the plurality of local distances that has been nonlinear-transformed; and a comparing unit 207 configured to compare the matching score with a predefined discriminating threshold to determine whether the inputted utterance is an utterance containing the password spoken by the enrolled speaker.

In the embodiment, the speaker template is generated by using the method for enrollment of speaker authentication, which contains acoustic features and the discriminating threshold for the password utterance used during enrollment. The apparatus 200 for verification of speaker authentication in this embodiment is designed to compare in the compare unit 207 and determine that the inputted utterance is an utterance containing the password spoken by the enrolled speaker if the DTW matching score calculated by the matching score calculator 206 is smaller than the predetermined discriminating threshold, otherwise the verification is determined as failed.

The apparatus 200 for verification of speaker authentication and its components in this embodiment may be inplemented with specifically designed circuits or chips, and also can be implemented by executing corresponding programs on a general computer (processor). Furthermore, the apparatus 200 for verification of speaker authentication in this embodiment can operationally implement the method for verification of speaker authentication in the embodiment described above in conjunction with FIG. 1.

Figure 5:
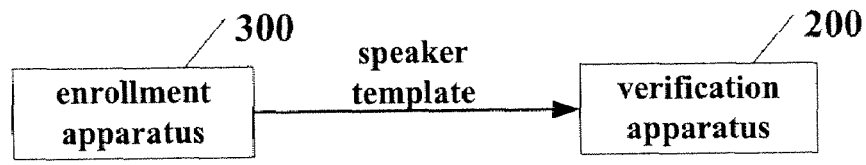
FIG. 5 is a block diagram showing a system for speaker authentication according to an embodiment of the present invention.

Based on the same concept of the invention, FIG. 5 is a block diagram showing a system for speaker authentication according to an embodiment of the present invention. The description of this embodiment will be given below in conjunction with FIG. 5, with a proper omission of the same content as those in the above-mentioned embodiments.

As shown in FIG. 5, the system for speaker authentication in this embodiment comprises: an enrollment apparatus 300, which can be an apparatus 300 for enrollment of speaker authentication; and a verification apparatus 200, which can be an apparatus 200 for verification of speaker authentication described in an above-mentioned embodiment. A speaker template generated by the enrollment apparatus 300 is transferred to the verification apparatus 200 via any communication means, such as a network, an internal channel, a disk or other recording media.

Thus, if the system for speaker authentication of this embodiment is adopted, the nonlinear transformed matching score will be more discriminatory than the conventional methods, thereby the system performance can be remarkably improved. Moreover, further better performance can be achieved by using the frame-dependent parameter than only by using the template-dependent parameter as before.

Though the method and apparatus for verification of speaker authentication and the system for speaker authentication have been described in details with some exemplary embodiments, these above embodiments are not exhaustive. Those skilled in the art may make various variations and modifications within the spirit and scope of the present invention. Therefore, the present invention is not limited to these embodiments; rather, the scope of the present invention is only defined by the appended claims.

The invention claimed is:

1. A method for enrollment of speaker authentication, comprising:
   inputting an utterance containing a password that is spoken by a speaker;
   extracting an acoustic feature vector sequence from said inputted utterance;
   DTW(Dynamic Timing Warping)-matching said extracted acoustic feature vector sequence and a speaker template enrolled by an enrolled speaker;
   calculating each of a plurality of local distances between said DTW-matched acoustic feature vector sequence and said speaker template;
   nonlinear-transforming said each local distance calculated to give more weights on small local distances;
   calculating a DTW-matching score based on said plurality of local distances nonlinear-transformed; and
   comparing said matching score with a predefined discriminating threshold to determine whether said inputted utterance is an utterance containing a password spoken by the enrolled speaker,
   wherein said nonlinear-transforming said each local distance calculated is performed by using a function, the third derivative of which is negative at the range of $(0, \infty)$.

2. The method for verification of speaker authentication according to claim 1, wherein said function is any one of $\exp(-d/para)$, $\ln(d/para)$, $\arctan(d/para)$, $d/para$, and their combination, wherein d is the local distance, and para is a parameter.

3. The method for verification of speaker authentication according to claim 2, wherein said parameter is a constant.

4. The method for verification of speaker authentication according to claim 2, wherein said parameter is a parameter dependent on said speaker template.

5. The method for verification of speaker authentication according to claim 4, wherein said parameter dependent on said speaker template is said discriminating threshold.

6. The method for verification of speaker authentication according to claim 2, wherein said parameter is a parameter dependent on a frame.

7. The method for verification of speaker authentication according to claim 6, wherein said parameter dependent on a frame is calculated by accounting for each frame separately during an enrollment process.

8. An apparatus for verification of speaker authentication, comprising:

- an utterance input unit configured to input an utterance containing a password that is spoken by a speaker;
- an acoustic feature vector sequence extractor configured to extract an acoustic feature vector sequence from said inputted utterance;
- a DTW(Dynamic Timing Warping)-matching unit configured to DTW-match said extracted acoustic feature vector sequence and a speaker template enrolled by an enrolled speaker;
- a local distance calculator configured to calculate each of a plurality of local distances between said DTW-matched acoustic feature vector sequence and said speaker template;
- a local distance nonlinear-transform unit configured to nonlinear-transform said each local distance calculated to give more weights on small local distances;
- a matching score calculator configured to calculate a DTW-matching score based on said plurality of local distances nonlinear-transformed; and
- a compare unit configured to compare said matching score with a predefined discriminating threshold to determine whether said inputted utterance is an utterance containing a password spoken by the enrolled speaker,
- wherein said local distance nonlinear-transform unit nonlinear-transforms said each local distance calculated by using a function, the third derivative of which is negative at the range of $(0, \infty)$.

* * * * *